(12) United States Patent
Ichikawa

(10) Patent No.: US 11,611,686 B2
(45) Date of Patent: *Mar. 21, 2023

(54) VIDEO SIGNAL PROCESSING DEVICE, VIDEO FREEZE DETECTING CIRCUIT AND METHOD OF DETECTING VIDEO FREEZE

(71) Applicant: LAPIS SEMICONDUCTOR CO., LTD., Yokohama (JP)

(72) Inventor: Tomoyuki Ichikawa, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,064

(22) Filed: Dec. 27, 2019

(65) Prior Publication Data

US 2020/0244841 A1    Jul. 30, 2020

(30) Foreign Application Priority Data

Jan. 30, 2019  (JP) .............................. JP2019-14013

(51) Int. Cl.
  *H04N 5/14*   (2006.01)
  *H04N 17/00*  (2006.01)
  *G06F 11/10*  (2006.01)
  *G06V 20/40*  (2022.01)

(52) U.S. Cl.
  CPC ......... *H04N 5/147* (2013.01); *G06F 11/1004* (2013.01); *G06V 20/48* (2022.01); *G06V 20/49* (2022.01); *H04N 17/002* (2013.01)

(58) Field of Classification Search
  CPC ...... H04N 5/147; H04N 17/002; H04N 7/183; H04N 7/18; G06F 11/1004; G06K 9/00758; G06K 9/00765; G06T 7/269; G06T 7/11

USPC ......................................................... 348/187
See application file for complete search history.

(56) References Cited

U.S. PATENT DOCUMENTS

2015/0350495 A1* 12/2015 Gifford .................... H04N 9/87
                                                        386/241
2017/0195556 A1*  7/2017 Emi ..................... H04N 5/2256

FOREIGN PATENT DOCUMENTS

JP          2018-0798939 A      5/2018

OTHER PUBLICATIONS

English translation of Abstract for JP2018-79839.

* cited by examiner

*Primary Examiner* — Jeff A Burke
*Assistant Examiner* — Sihar A Karwan
(74) *Attorney, Agent, or Firm* — Volentine, Whitt & Francos, PLLC

(57) ABSTRACT

A video signal processing device including a video signal dividing unit that divides a video signal into first to k-th division video signals (k is an integer of 2 or more) for each frame; a video change detecting unit that detects, for each of the first to k-th division video signals, whether or not there has occurred a change in the video signal between the frames, and generates first to k-th video change detection signals representing the detection results; and a video no-change determining unit that generates a video no-change signal indicating that there is no change in the video signal when the number of video change detection signals indicating that there is no change among the first to k-th video change detection signals is greater than a predetermined number.

7 Claims, 5 Drawing Sheets

Fig. 4

| | PD1 | PD2 | PD3 | PD4 | PD5 | PD6 | ...... | PD(n) | |
|---|---|---|---|---|---|---|---|---|---|
| | R7 | G0 | B7 | R0 | G7 | B0 | | R7 | SP1 |
| | R6 | G1 | B6 | R1 | G6 | B1 | | R6 | SP2 |
| | R5 | G2 | B5 | R2 | G5 | B2 | | R5 | SP3 |
| | R4 | G3 | B4 | R3 | G4 | B3 | | R4 | SP4 |
| | R3 | G4 | B3 | R4 | G3 | B4 | | R3 | SP5 |
| | R2 | G5 | B2 | R5 | G2 | B5 | | R2 | SP6 |
| | R1 | G6 | B1 | R6 | G1 | B6 | | R1 | SP7 |
| | R0 | G7 | B0 | R7 | G0 | B7 | | R0 | SP8 |
| | G7 | B0 | R7 | G0 | B7 | R0 | | G7 | SP9 |
| | G6 | B1 | R6 | G1 | B6 | R1 | | G6 | SP10 |
| | G5 | B2 | R5 | G2 | B5 | R2 | | G5 | SP11 |
| | G4 | B3 | R4 | G3 | B4 | R3 | | G4 | SP12 |
| | G3 | B4 | R3 | G4 | B3 | R4 | | G3 | SP13 |
| | G2 | B5 | R2 | G5 | B2 | R5 | | G2 | SP14 |
| | G1 | B6 | R1 | G6 | B1 | R6 | | G1 | SP15 |
| | G0 | B7 | R0 | G7 | B0 | R7 | | G0 | SP16 |
| | B7 | R0 | G7 | B0 | R7 | G0 | | B7 | SP17 |
| | B6 | R1 | G6 | B1 | R6 | G1 | | B6 | SP18 |
| | B5 | R2 | G5 | B2 | R5 | G2 | | B5 | SP19 |
| | B4 | R3 | G4 | B3 | R4 | G3 | | B4 | SP20 |
| | B3 | R4 | G3 | B4 | R3 | G4 | | B3 | SP21 |
| | B2 | R5 | G2 | B5 | R2 | G5 | | B2 | SP22 |
| | B1 | R6 | G1 | B6 | R1 | G6 | | B1 | SP23 |
| | B0 | R7 | G0 | B7 | R0 | G7 | | B0 | SP24 |

VIDEO SIGNAL PROCESSING DEVICE, VIDEO FREEZE DETECTING CIRCUIT AND METHOD OF DETECTING VIDEO FREEZE

CROSS-REFERENCE TO RELATED APPLICATION

This application is based upon and claims the benefit of priority from the prior Japanese Patent Application No. 2019-014013 filed on Jan. 30, 2019, the entire contents of which are incorporated herein by reference.

BACKGROUND OF THE INVENTION

1. Field of the Invention

The present invention relates to a video signal processing device which detects no change in a video signal, a video freeze detecting circuit, and a method of detecting a video freeze.

2. Description of the Related Art

Recently, in order to provide driving assistance to a vehicle driver, a display system for a vehicle has been proposed in which a vehicle front image or a rear image photographed by a vehicle-installed camera is displayed on a vehicle-installed display (for example, Japanese Patent Kokai No. 2018-79839).

In such a vehicle display system, in spite of the fact that a scene which is an object to be photographed is changed, when a so-called video freeze is detected in which there is no change in a video based on a video signal output from the camera, a freeze corresponding process for notifying the detection is performed. For example, such a video freeze occurs when a camera installed in a vehicle, which photographs a scene, is broken down during running of the vehicle, and the broken-down camera repeatedly outputs video data of one frame immediately before the particular breakdown.

Thus, in the above vehicle display system, a video data piece of a current frame constructed a scene photographed by the camera is compared with a video data piece of a preceding frame prior to the current frame by one frame, and it is determined that the video freeze has been generated if the video data pieces equal to each other. In general, since the data amount of a video data piece is large, when video data pieces are directly compared with each other, a heavy load is imposed on the comparison processing. Therefore, in order to reduce such a load, in the vehicle display system, it is proposed to compare hash values obtained by applying, for example, SHA (Secure Hash Algorithm), MD5 (Message Digest Algorithm 5), CRC (Cyclic Redundancy Check), or the like to video data, instead of comparing in level video data pieces with each other.

However, in the case where the above-described breakdown occurs in the camera, when external noise and so on is immixed in a transmission path from the camera up to a display, for example, a CRC check value as a hash value changes for each frame due to influence of the noise.

Therefore, although a video signal output from the broken-down camera is frozen, a video data piece contained a current frame in the transmission path and a preceding video data piece prior to the current frame by one frame do not coincide with each other under the noise immixture, so that it may be impossible to correctly detect such conditions that the video signal is frozen.

SUMMARY OF THE INVENTION

An object of the present invention is to provide a video signal processing device, a video freeze detecting circuit, and a video freeze detection method capable of correctly detecting that a video signal is frozen, for example, even in a noise environment.

According to the present invention, a video signal processing device comprises: a video signal dividing unit configured to receive a video signal including a series of frames, and to divide said video signal into first to k-th division video signals (k is an integer of 2 or more) for each frame; a video change detecting unit configured to detect, for each of said first to k-th division video signals, whether or not there has occurred a change in said video signal between frames based on said division video signals, and to generate first to k-th video change detection signals representing respective results of the detection; and a video no-change determining unit configured to generate a video no-change signal indicating that there is no change in said video signal when a number of video change detection signals indicating that there is no change in the video based on said division video signals, among said first to k-th video change detection signals, is greater than a predetermined number.

According to the present invention, a video freeze detecting circuit comprises: a video signal dividing unit configured to receive a video signal including a series of frames, and to divide said video signal into first to k-th division video signals (k is an integer of 2 or more) for each frame; a video change detecting unit configured to detect, for each of said first to k-th division video signals, whether or not there has occurred a change in said video signal between the respective frames based on said division video signals, and to generate first to k-th video change detection signals representing respective results of the detection; and a freeze determination unit configured to obtain an average number of a number of video change detection signals indicating that there is no change in a video among said first to k-th video change detection signals within an M (M is an integer of 2 or more) frame period, and to output a freeze detection signal indicating that said video signal is frozen when said average number is greater than a predetermined number.

According to the present invention, a method of detecting a video freeze comprises: a step of dividing a video signal including a series of frames into first to k-th division video signals (k is an integer of 2 or more) for each frame; a step of detecting, for each of said first to k-th division video signals, whether or not there has occurred a change in said video signal between the respective frames based on said division video signals, and of generating first to k-th video change detection signals representing respective results of the detection; and a step of obtaining an average number of a number of video change detection signals indicating that there is no change in a video among said first to k-th video change detection signals within an M (M is an integer of 2 or more) frame period, and of outputting a freeze detection signal indicating that said video signal is frozen when said average number is greater than a predetermined number.

According to the present invention, the video signal processing device divides a video signal into a plurality of division video signals for each frame, and detects whether or not there has occurred a video change between the respective frames for each of the division video signals. When the number of detection signals indicating no-change in the video signal is greater than a predetermined number, a video no-change signal indicating that there is no change in the video signal is output.

According to the video signal processing device of the present invention, in spite of a freeze of a video signal, even if there is a difference between video signals corresponding to frames due to noise and so on, a correct detected result that the video signal is frozen can be obtained.

BRIEF DESCRIPTION OF THE DRAWINGS

FIG. 4 is a diagram showing an example of a division form when a video signal division unit divides the photographed video signal.

DETAILED DESCRIPTION OF THE INVENTION

Embodiments of the present invention will now be described below in detail with reference to the drawings.

Figure 1:
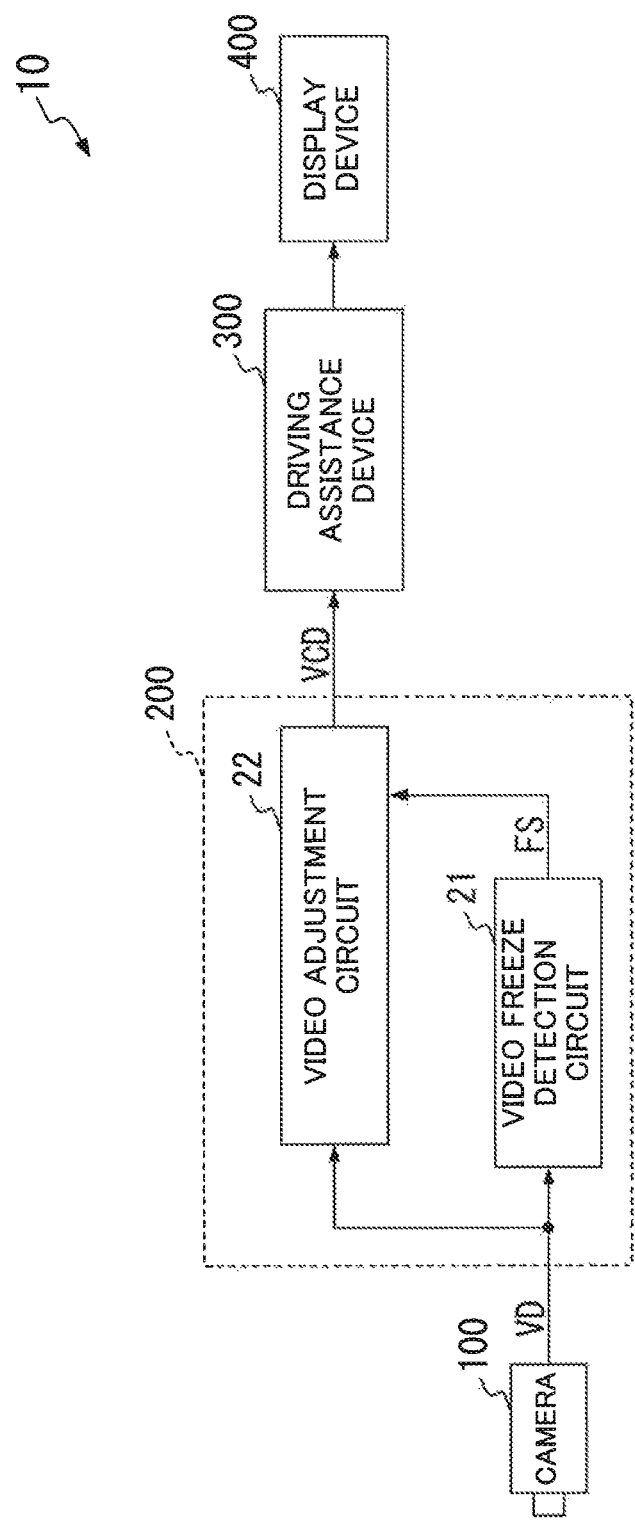
FIG. 1 is a block diagram showing a schematic configuration of a driving assistance system including a video signal processing device according to the present invention.

FIG. 1 is a block diagram showing a schematic configuration of a driver assistance system 10 including a video signal processing device according to the present invention.

As shown in FIG. 1, the driver assistance system 10 includes a camera 100, a video signal processing device 200, a driving assistance device 300, and a display device 400.

The camera 100 is installed in a vehicle, photographs scenes of the front, rear, and both sides of the vehicle, generates a video signal including a series of pixel data pieces corresponding to each pixel, and supplies the generated video signal as a photographed video signal VD to the video signal processing device 200.

Figure 2:
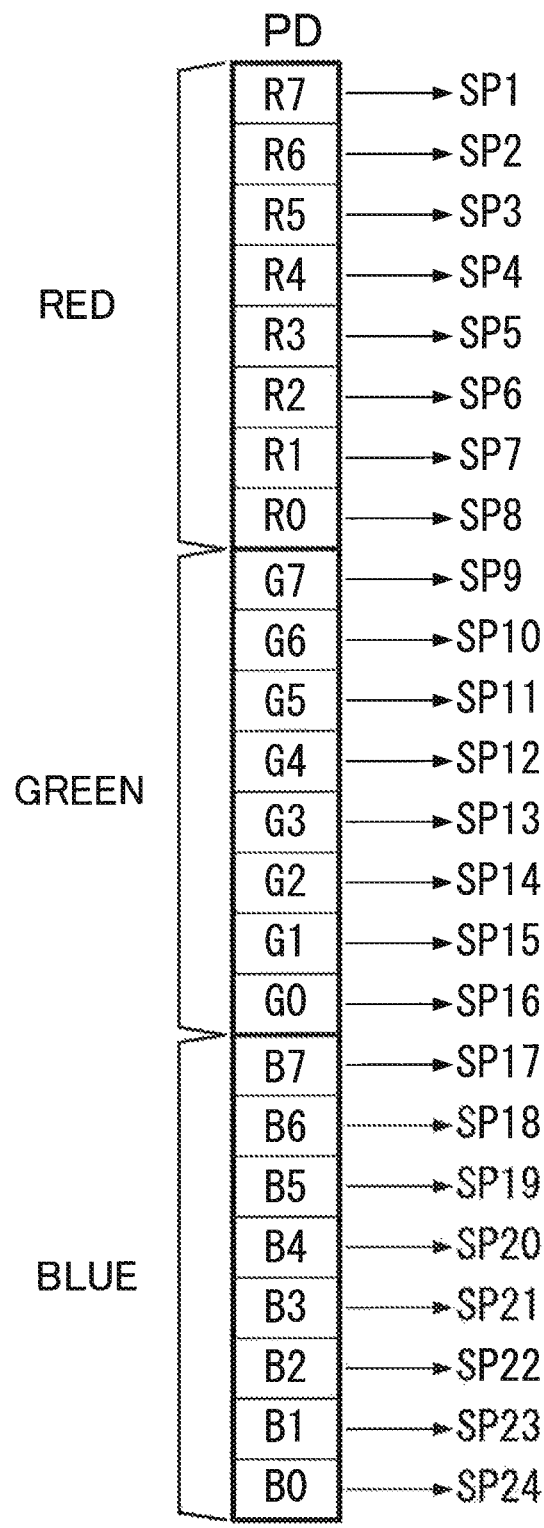
FIG. 2 is a diagram showing an example of a data format of pixel data included in a photographed video signal.

FIG. 2 is a diagram showing an example of a data format of a pixel data piece PD for one pixel in the photographed video signal VD.

As shown in FIG. 2, the pixel data piece PD has, for example, a total of 24 bits including bits R7 to R0 representing a red luminance level in 8 bits, bits G7 to G0 representing a green luminance level in 8 bits, and B7 to B0 representing a blue luminance level in 8 bits. Therefore, when the number of pixels for one frame in the photographed video signal VD is n (n is an integer equal to or greater than two), the video signal VD containing n pixel data pieces PD having the data format shown in FIG. 2 is supplied to the video signal processing device 200 for each one frame.

The video signal processing device 200 includes a video freeze detection circuit 21 and a video adjustment circuit 22. The video freeze detection circuit 21 detects, based on the photographed video signal VD, whether or not the photographed video shot by the camera 100 is in an unchanged state, that is, in a so-called frozen state, and supplies a freeze detection signal FS indicating the detected result to the video adjustment circuit 22. That is, the video freeze detection circuit 21 supplies the video adjustment circuit 22 with the freeze detection signal FS indicating "freeze" when the photographed video is in the frozen state, and "no freeze" when the photographed video is not in the frozen state.

When receiving the freeze detection signal FS indicating "no freeze," the video adjustment circuit 22 supplies a signal obtained by adjusting a hue, luminance, contrast, and so on concerning the photographed video signal VD to the driving assistance device 300. On the other hand, when receiving the freeze detection signal FS indicating "freeze," the video adjustment circuit 22 supplies a video signal indicating that freeze to the driving assistance device 300 as a photographed video signal VCD. For example, the video adjustment circuit 22 supplies the driving assistance device 300 with a photographed video signal VCD representing that the photographed video is in the frozen state by using characters or a whole screen single color (for example, blue).

Based on the photographed video signal VCD, the driving assistance device 300 performs various types of driving assistance control such as inter-vehicle control for maintaining at a constant a distance between the vehicle provided with the camera 100 and a preceding vehicle, lane deviation prevention control for urging the vehicle to drive along a running lane, approaching notification control to notify approaching of other vehicles, and collision avoidance control. In the driving assistance control, the driving assistance device 300 supplies images video representing various warning or indication messages associated with the driving assistance control to the display device 400 as a driving assistance video signal. The driving assistance device 300 may supply a video signal obtained by superimposing the warning or indication messages on the video based on the photographed video signal VCD, or the photographed video signal VCD itself as a monitor video signal to the display device 400.

Further, the driving assistance device 300 has a navigation function for guiding a current position of the vehicle and a route guidance to a destination, and supplies the display device 400 with a map image signal representing a surrounding map image including the current position.

The display device 400 includes, for example, a light emission indicator mounted on a door mirror, or a rear monitor display unit serving as an indoor mirror, in addition to a main display unit that displays images based on the map image signal and the driving assistance video signal mentioned above. For example, when the camera 100 photographs a scene behind the vehicle, the rear monitor display unit displays a video based on the photographed video signal VCD. When the video freeze detection circuit 21 detects that the video photographed by the camera 100 is in a frozen state, the main display unit and the rear monitor display unit display an image indicating the frozen state by using characters or a whole screen single color.

The detailed configuration of the video freeze detection circuit 21 will be described below.

Figure 3:
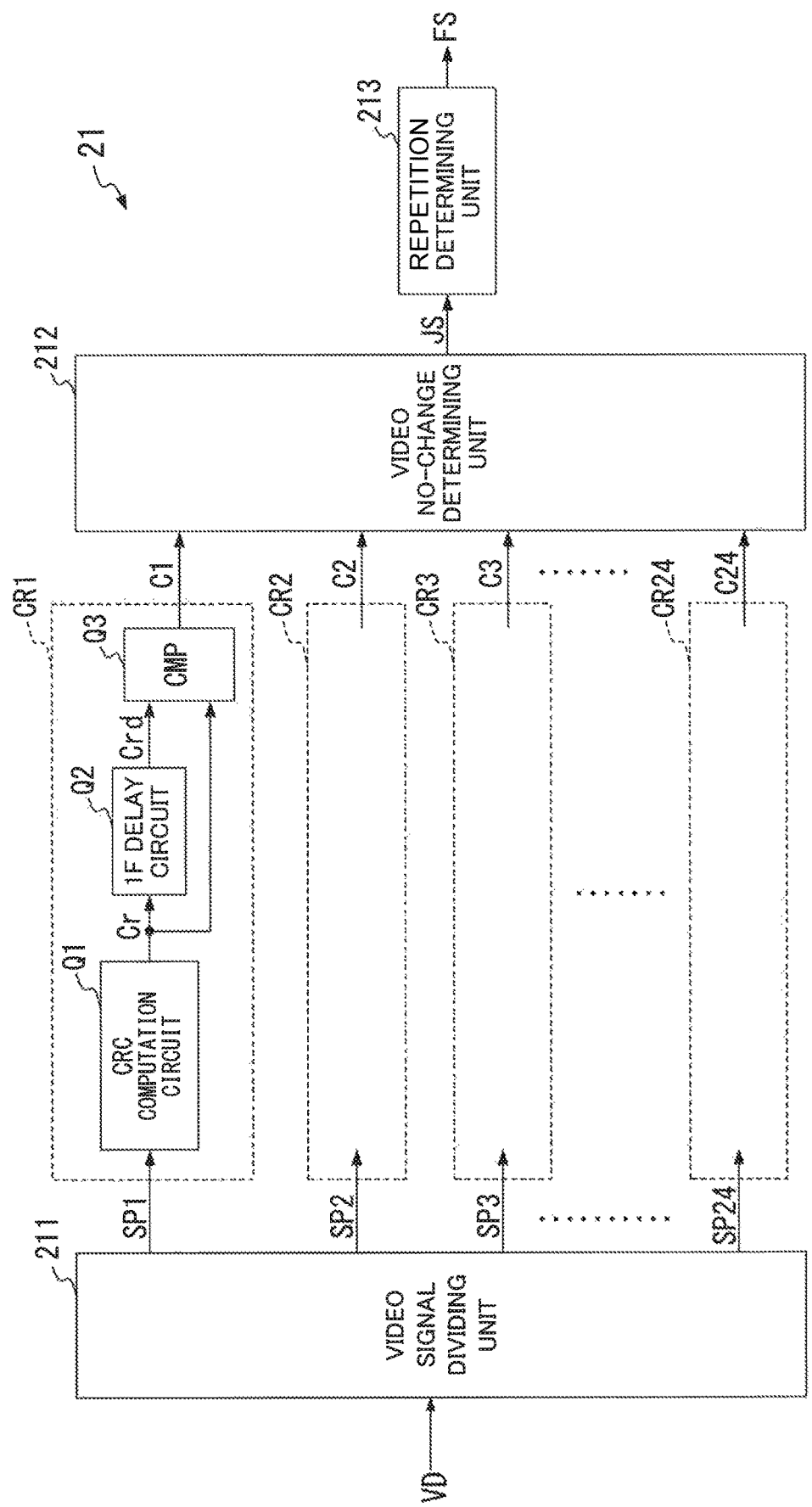
FIG. 3 is a block diagram showing an example of an internal configuration of a video freeze detection circuit.

FIG. 3 is a block diagram showing an example of the internal configuration of the video freeze detection circuit 21.

As shown in FIG. 3, the video freeze detection circuit 21 includes a video signal dividing unit 211, video change detection units CR1 to CR24, a video no-change determining unit 212, and a repetition determining unit 213.

The video signal dividing unit 211 receives the photographed video signal VD from the camera 100, and divides the photographed video signal VD into 24 pieces for each one frame of the photographed video signal VD to obtain divided video signal SP1 to SP24.

For example, the video signal dividing unit 211 divides each of the pixel data pieces (n pieces) PD for one frame into 24 pieces for each bit digit of the 24 bits (R7 to R0, G7 to G0, and B7 to B0) shown in FIG. 2. Then, the video signal dividing unit 211 generates a bit sequence for 24 systems by grouping each bit value obtained by dividing each of the n pixel data pieces PD into 24 for each bit digit by the same bit digit, to obtain division video signals SP1 to SP24. For example, the video signal dividing unit 211 obtains a divided video signal SP1 representing a bit sequence composed of a sequence of n bits R7, a divided video signal SP2 representing a bit sequence composed of a sequence of n bits R6, . . . , and a divided video signal SP24 representing a bit sequence composed of the bit B0. The division video signals SP1 to SP24 correspond to the video change detection units CR1 to CR24, respectively in a one-to-one relationship.

The video signal dividing unit 211 supplies the division video signals SP1 to SP24 to the video change detection units CR1 to CR24, respectively. That is, the video signal dividing unit 211 supplies the divided video signal SPk (k is an integer of 1 to 24) to the video change detection unit CRk.

Each of the video change detection units CR1 to CR24 has the same internal configuration, that is, a CRC computation circuit Q1, a 1F delay circuit Q2, and a comparison circuit Q3.

The CR1 of the video change detection units CR1 to CR24 is extracted and the internal configuration thereof will be described below.

The CRC computation circuit Q1 of the video change detection unit CR1 receives a sequence of n bits R7 in the divided video signal SP1 for each frame, and performs CRC (Cyclic Redundancy Check) computation on the n-bit R7 sequence. That is, the CRC computation circuit Q1 computes a remainder when the n-bit bit sequence corresponding to each frame is divided by a predetermined generator polynomial. The CRC computation circuit Q1 supplies the remainder computed for each frame in this manner to the 1F delay circuit Q2 and the comparison circuit Q3 as a check value Cr. The 1F delay circuit Q2 supplies the check value Cr, which is delayed by one frame period, to the comparison circuit Q3 as a delayed check value Crd. The comparison circuit Q3 determines whether or not the check value Cr and the delayed check value Crd are equal to each other, and supplies a video change detection signal C1 indicating "no change" when the two values are equal to each other and "change" when the two values are different from each other to the video no-change determining unit 212.

By the above mentioned configuration, the video change detection unit CR1 first performs the CRC computation on the n-bit bit sequence represented by the divided video signal SP1, that is, the bit sequence configured by dividing only the bit R7 of each of the n pixel data pieces PD for one frame, and obtains a check value Cr as a result of the CRC computation. The video change detection unit CR1 compares the check value Cr in a current frame with a check value Crd in a preceding frame prior to the current frame by one frame. When the check value Cr in the current frame is equal to the check value Crd in the previous frame, the video change detection unit CR1 determines that there is no video change between the adjacent frames to generate a video change detection signal C1 representing "no change." On the other hand, when the check value Cr in the current frame is unequal to the check value Crd in the previous frame, the video change detection unit CR1 determines that there is a video change between the adjacent frames to generate a video change detection signal C1 representing "change."

Therefore, the video change detection units CR1 to CR24 each including the CRC calculation circuit Q1, the 1F delay circuit Q2, and the comparison circuit Q3 obtain check values Cr (Crd) by performing the CRC computation for each frame to the divided video signal SP1 to SP24 received.

Each of the video change detection units CR1 to CR24 detects whether or not there is a video change by comparing the check values Cr and Crd between adjacent frames. The video change detection units CR1 to CR24 generate video change detection signals C1 to C24 individually indicating the detection results.

The video no-change determining unit 212 determines that there is no change in the video signal based on the photographed video signal VD when the number of video change detection signals indicating "no change" of the video change detection signals C1 to C24 is greater than a predetermined number L, and generates a video no-change signal JS indicating the determined result to supply it to the repetition determining unit 213.

The repetition determining unit 213 outputs a freeze detection signal FS indicating "freeze" when the video no-change signal JS is repeatedly generated during a period of M (M is an integer of 2 or more) or more frames, and outputs a freeze detection signal FS indicating "no freeze" during periods other than the generated period of M or more frames of the video no-change signal JS.

Therefore, in the video freeze detection circuit 21 shown in FIG. 3, even if a photographed video is frozen and parts of the photographed video signals corresponding to frames are different from each other due to immixing of noise or the like, it is possible to output the freeze detection signal FS indicating "freeze."

That is, when the number of division video signals in which video changes are detected among the division video signals SP1 to SP24 is equal to or less than the predetermined number L, the video freeze detection circuit 21 determines that this is a video change due to the influence of noise or the like and that the photographed video itself has no video change. When such a state is repeated during M frames, the video freeze detection circuit 21 determines that the photographed video is frozen and then outputs the freeze detection signal FS indicating "freeze."

Therefore, the video freeze detection circuit 21 can correctly detect that a video shot by the camera 100 is frozen even under a noisy environment.

In the above-mentioned embodiment, when the photographed video signal VD is divided in the video signal dividing unit 211, n pixel data pieces PD each having 24 bits is grouped by each of the same bit digits for each frame, so that the 24 division video signals SP1 to SP24 are obtained.

However, in the video signal dividing unit 211, when the bit digits of each of the n pixel data pieces PD are divided in correspondence with the division video signals SP1 to SP24, the correspondence relationship between the bit digits and the division video signals SP1 to SP24 may be changed for each of the pixel data pieces PD.

FIG. 4 is a diagram showing an example of the form of bit groups included in each of the division video signals SP1 to SP24 made in view of the above mentioned points.

That is, the video signal dividing unit 211 groups the bit groups corresponding to each color (red, green, blue) of the pixel data pieces PD1 to PD(n) for one frame in association with the division video signals SP1 to SP24, respectively by the form shown by broken lines in FIG. 4.

For example, as shown in FIG. 4, the video signal dividing unit 211 selects a seventh bit group (R7, G7, B7) and a zeroth bit group (R0, G0, B0) of each color from each of the pixel data pieces PD1 to PD(n), and obtains a divided video signal SP1 by grouping the selected groups. As shown in FIG. 4, the video signal dividing unit 211 selects a sixth bit group (R6, G6, B6) and a first bit group (R1, G1, B1) of each color from each of the pixel data pieces PD1 to PD(n), and obtains a divided video signal SP2 by grouping the selected groups. As shown in FIG. 4, the video signal dividing unit 211 selects a fifth bit group (R5, G5, B5) and a second bit group (R2, G2, B2) of each color from each of the pixel data pieces PD1 to PD(n), and obtains a divided video signal SP3 by grouping the selected groups. Further, as shown in FIG. 4, the video signal dividing unit 211 selects a fourth bit group (R4, G4, B4) and a third bit group (R3, G3, B3) of each color from each of the pixel data pieces PD1 to PD(n), and obtains a divided video signal SP4 by grouping the selected groups.

The reason for dividing the photographed video signal VD in the form shown in FIG. 4 instead of FIG. 2 will be described below.

In the case where a video change between frames is detected based on the check value of the CRC computation, even if the video signal changes for each frame, it is possible that the check values of adjacent frames are equal to each other.

In particular, in the case where freeze detection is performed using the division video signals SP1 to SP24 divided in the form shown in FIG. 2, it is possible to erroneously determine that a freeze in a photographed video having no freeze has occurred even if only some of the colors and bits in the photographed video have changed.

For example, when the photographed video signal VD in which only the bits R0 and R1 change for each frame in the n pixel data pieces PD for one frame is received, influence by the changes appears only in the signals SP7 and SP8 of the division video signals SP1 to SP24. Thus, among the video change detection units CR1 to CR24, the units CR7 and CR8 obtain a detection result of "change". All the video change detection units other than the units CR7 and CR8 obtain a detection result of "no change." Therefore, at this time, it is possible that the video freeze detection circuit 21 outputs an erroneous freeze detection signal FS indicating "freeze" although such a freeze has not occurred in the photographed video.

On the other hand, in the case where the freeze detection is performed using the division video signals SP1 to SP24 divided in the form shown in FIG. 4, each bit (R7 to R0, G7 to G0, B7 to B0) in the pixel data pieces PD appears by dispersing into a plurality of division video signals. In the example shown in FIG. 4, the bits R0 and R1 of each of the pixel data pieces PD appear in the division video signals SP1, SP2, SP7, SP8, SP15 to SP18, SP23 and SP24. Therefore, since many units (CR1, CR2, CR7, CR8, CR15 to CR18, CR23, and CR24) among the video change detection units CR1 to CR24 have a "change" detection result, a probability of erroneous detection that a freeze has occurred can be reduced.

In the above-mentioned embodiment, the photographed video signal VD is divided into 24 division video signals (SP1 to SP24) for each frame, and it is detected whether or not a video has changed for each of the division video signals. However, the number of divisions for dividing the photographed video signal VD is not limited to 24. Further, the method of dividing the photographed video signal VD is not limited to the above-mentioned embodiment. For example, instead of dividing the pixel data pieces PD in a bit unit as in the above-mentioned embodiment, for each of a plurality of areas into which the entire area of one screen is divided, it may be divided in a unit of pixel data piece PD belonging to the area.

In the above-mentioned embodiment, the video freeze detection circuit 21 performs the freeze detection as described above on the photographed video signal VD output from the camera 100. However, the video freeze detection circuit 21 may perform freeze detection on a video signal read from a memory in which the video signal is previously stored. Further, in the above-mentioned embodiment, as in the data format shown in FIG. 2, a photographed video signal VD including the pixel data piece PD representing red, green, and blue luminance levels is an input target. However, a video signal having another data format may be input. In short, the data format of the video signal to be input is not limited as long as the video signal does not include an error detection code or error correction code.

In the above-mentioned embodiment, a CRC check value is used to detect whether or not a video has changed for each divided video signal. Instead of the CRC check value, a hash value such as SHA (Secure Hash Algorithm) or MD5 (Message Digest Algorithm 5) may be used.

In short, the video signal processing device according to the present invention only may include the following video signal division unit, video change detecting unit, and video no-change determining unit.

The video signal dividing unit (211) receives a video signal (VD), and divides the video signal for each frame into first to k-th (k is an integer of 2 or more) division video signals (SP1 to SP24) corresponding to the frame. The video change detection units (CR1 to CR24) detect whether or not there has occurred a change in the video signal between the respective frames based on the division video signals for each of the first to k-th division video signals, and generate first to k-th video change detection signals (C1 to C24) representing the respective detection results. The video no-change determining unit (212) outputs a video no-change signal (JS) indicating that there is no change in the video signal when the number of video change detection signals indicating that there is no change in the video based on the division video signals, among the first to k-th video change detection signals, is greater than a predetermined number (L).

In the embodiment shown in FIG. 3, the video no-change determining unit 212 and the repetition determining unit 213 determine whether or not the photographed video signal VD is frozen in accordance with on the video change detection signals C1 to C24, and output the freeze detection signal FS as the determination result.

Therefore, the video no-change determining unit 212 and the repetition determining unit 213 may be regarded as a freeze determining unit.

Figure 5:
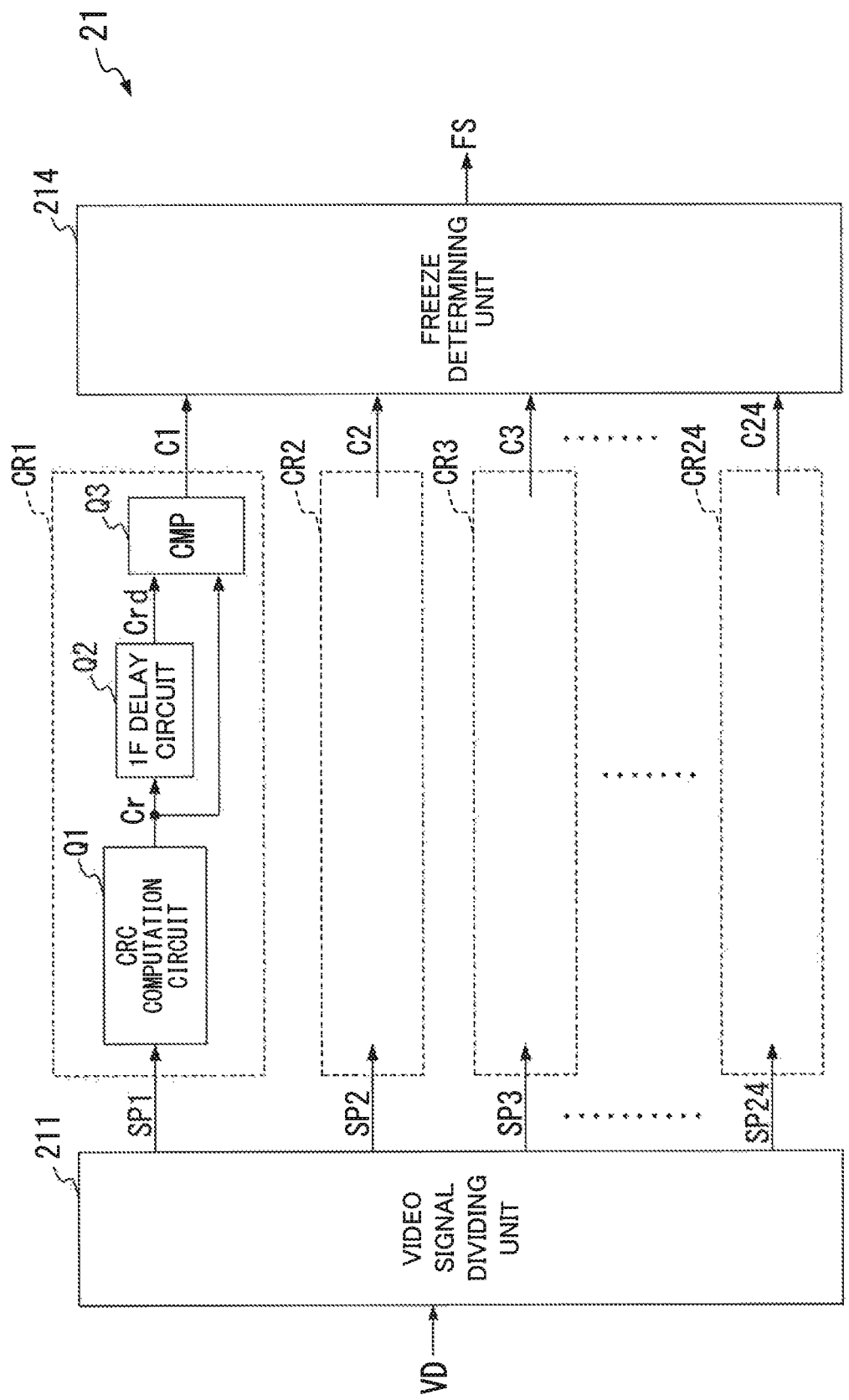
FIG. 5 is a block diagram showing another example of the internal configuration of the video freeze detection circuit.

FIG. 5 is a block diagram showing another example of the configuration of the video freeze detection circuit 21 structured in view of the above-mentioned point.

In the configuration shown in FIG. 5, a freeze determination unit 214 is used instead of the video no-change determining unit 212 and the repetition determining unit 213 shown in FIG. 3, and the configurations and operations of the video signal dividing unit 211 and the video change detection units CR1 to CR24 are the same as those shown in FIG. 3.

The freeze determination unit 214 outputs freeze detection signal FS based on the video change detection signals C1 to C24 by the same operation as the video no-change determining unit 212 and the repetition determining unit 213. The freeze determination unit 214 may obtain an average number of the number of video change detection signals indicating that there is no change in a video among the video change detection signals C1 to C24 within an M (M is an integer of 2 or more) frame period, and may output the freeze detection signal FS indicating that the photographed video signal VD is frozen when the average number is greater than the predetermined number L.

In the example shown in FIG. 1, the video freeze detection circuit 21 is used for detecting the freeze state of the video signal. However, the video freeze detection circuit 21 can also be used for still image detection for detecting whether or not the video signal represents a still image.

What is claimed is:

1. A video signal processing device comprising:
    a video signal dividing circuit configured to receive a video signal including a series of N frames and a series of pixel data pieces for each of the N frames, and to divide said video signal into first to k-th division video signals for each of the N frames, wherein N is an integer of 2 or more, and k is an integer of 2 or more;
    a video change detecting circuit configured to detect whether or not there is a difference in each of said first to k-th division video signals between adjacent frames of the N frames by comparing said first to k-th division video signals in one of the adjacent frames with said first to k-th division video signals in the other of the adjacent frames, respectively, and to generate first to k-th video change detection signals representing respective results of the detection;
    a video no-change determining circuit configured to generate a video no-change signal indicating that there is no change in said video signal between said adjacent frames of the N frames when regarding a number of video change detection signals indicating that there is no difference among said first to k-th video change detection signals between said adjacent frames of the N frames, the number is greater than a predetermined number L, wherein L is an integer of 1 or more and L is k or less; and
    a repetition determining circuit configured to output a freeze detection signal indicating that there is no change in a video based on said video signal when said video no-change signal is repeatedly generated during a period of M frames of the N frames, wherein M is an integer of 2 or more and M is N or less.

2. The video signal processing device according to claim 1, wherein said video change detecting circuit comprises:
    first to k-th cyclic redundancy check computation circuits configured to individually perform cyclic redundancy check computation on said first to k-th division video signals to compute remainders as first to k-th check values;
    delay circuits configured to delay said first to k-th check values by one frame period to generate first to k-th delayed check values; and
    comparison circuits configured to compare said first to k-th check values with said first to k-th delayed check values, respectively, and to generate k signals individually indicating comparison results as said first to k-th video change detection signals.

3. The video signal processing device according to claim 1, wherein said video signal includes a series of n pixel data pieces which represent a luminance level of each pixel by first to k-th bits for each of the N frames, wherein n is an integer of 2 or more, and
    wherein said video signal dividing circuit is configured to divide said first to k-th bits of each of said n pixel data pieces for each bit in correspondence with said first to k-th division video signals, and generate first to k-th bit groups obtained by grouping bits of each of said n pixel data pieces corresponding to each other as said first to k-th division video signals.

4. The video signal processing device according to claim 3, wherein said video signal dividing circuit is configured to group said first to k-th bits of each of said n pixel data pieces for each same bit digit.

5. The video signal processing device according to claim 3, wherein said video signal dividing circuit is configured to change a correspondence relationship between said first to k-th bits and said first to k-th division video signals for each of said pixel data pieces when it divides said first to k-th bits of each of said n pixel data pieces for each bit in correspondence with said first to k-th division video signals.

6. A video freeze detecting circuit comprising:
    a video signal dividing circuit configured to receive a video signal including a series of N frames and a series of pixel data pieces for each of the N frames, and to divide said video signal into first to k-th division video signals for each of the N frames, wherein N is an integer of 2 or more, and k is an integer of 2 or more;
    a video change detecting circuit configured to detect whether or not there is a difference in each of said first to k-th division video signals between adjacent frames of the N frames by comparing said first to k-th division video signals in one of the adjacent frames with said first to k-th division video signals in the other of the adjacent frames, respectively, and to generate first to k-th video change detection signals representing respective results of the detection; and
    a freeze determination circuit configured to obtain an average number of a number of video change detection signals indicating that there is no difference among said first to k-th video change detection signals within a period of M frames of the N frames, and to output a freeze detection signal indicating that there is no change in a video based on said video signal when said average number is greater than a predetermined number, wherein M is an integer of 2 or more and M is N or less.

7. A method of detecting a video freeze comprising:
    a step of dividing a video signal including a series of N frames and a series of pixel data pieces for each of the N frames into first to k-th division video signals for each of the N frames, wherein N is an integer of 2 or more, and k is an integer of 2 or more;
    a step of detecting whether or not there is a difference in each of said first to k-th division video signals between adjacent frames of the N frames by comparing said first to k-th division video signals in one of the adjacent frames with said first to k-th division video signals in the other of the adjacent frames, respectively, and of generating first to k-th video change detection signals representing respective results of the detection; and
    a step of obtaining an average number of a number of video change detection signals indicating that there is no difference among said first to k-th video change detection signals within a period of M frames of the N frames, and of outputting a freeze detection signal indicating that there is no change in a video based on said video signal when said average number is greater than a predetermined number, wherein M is an integer of 2 or more and M is N or less.

* * * * *